(12) United States Patent
Hundt et al.

(10) Patent No.: US 9,563,532 B1
(45) Date of Patent: Feb. 7, 2017

(54) ALLOCATION OF TASKS IN LARGE SCALE COMPUTING SYSTEMS

(75) Inventors: Robert Hundt, Piedmont, CA (US);
Lingjia Tang, Charlottesville, VA (US);
Jason Mars, Charlottesville, VA (US)

(73) Assignee: Google Inc., Mountain View, CA (US)

( * ) Notice: Subject to any disclaimer, the term of this patent is extended or adjusted under 35 U.S.C. 154(b) by 1150 days.

(21) Appl. No.: 13/310,054

(22) Filed: Dec. 2, 2011

(51) Int. Cl.
*G06F 15/173* (2006.01)
*G06F 11/34* (2006.01)

(52) U.S. Cl.
CPC ....... *G06F 11/3409* (2013.01); *G06F 11/3466* (2013.01)

(58) Field of Classification Search
CPC .............. G06F 11/3409; G06F 11/3466; G06F 2201/88; G06F 2201/86
USPC ........................................................ 709/224
See application file for complete search history.

(56) References Cited

U.S. PATENT DOCUMENTS

| | | | | |
|---|---|---|---|---|
| 5,729,472 A * | 3/1998 | Seiffert et al. ................. | 702/188 |
| 6,185,659 B1 * | 2/2001 | Milillo et al. ...... | G06F 12/0862 |
| | | | | 710/34 |
| 6,560,648 B1 * | 5/2003 | Dunn et al. .................... | 709/224 |
| 6,889,159 B2 * | 5/2005 | Klotz et al. ........... | G06F 11/263 |
| | | | | 702/120 |
| 7,028,096 B1 * | 4/2006 | Lee .............................. | 709/231 |
| 7,065,676 B1 * | 6/2006 | Lang et al. ............ | G11C 29/56 |
| | | | | 714/32 |
| 7,533,241 B2 * | 5/2009 | Begon et al. ........ | G06F 12/0802 |
| | | | | 711/207 |
| 7,539,839 B1 * | 5/2009 | Rhoten .................... | G06F 11/22 |
| | | | | 711/171 |
| 7,552,396 B1 * | 6/2009 | Bicheno et al. ....... | G06F 11/324 |
| | | | | 715/736 |
| 7,577,701 B1 * | 8/2009 | Johns et al. ................... | 709/203 |
| 7,610,523 B1 * | 10/2009 | Singh ...................... | G11C 29/42 |
| | | | | 365/200 |
| 7,624,225 B2 * | 11/2009 | Gower et al. ............ | G11C 5/04 |
| | | | | 711/105 |
| 7,805,706 B1 * | 9/2010 | Ly et al. ................ | G06F 9/5083 |
| | | | | 709/221 |
| 8,018,357 B1 * | 9/2011 | Tsai ......................... | H03M 5/20 |
| | | | | 341/56 |
| 8,239,182 B2 * | 8/2012 | Kanade ................ | G06F 17/5045 |
| | | | | 703/13 |
| 8,863,022 B2 * | 10/2014 | Rhodes et al. ................. | 715/781 |
| 8,966,454 B1 * | 2/2015 | Michelsen et al. ............ | 717/133 |
| 9,110,496 B1 * | 8/2015 | Michelsen ................ | G06F 1/00 |
| 2002/0099821 A1 * | 7/2002 | Hellerstein et al. .......... | 709/224 |

(Continued)

*Primary Examiner* — Hieu Hoang
(74) *Attorney, Agent, or Firm* — Fish & Richardson P.C.

(57) ABSTRACT

Aspects of the invention may be used to allocate tasks among computing machines in large scale computing systems. In one aspect, the method includes executing a first task in the plurality of tasks on a first computing machine and determining a performance degradation threshold for the first task. The method further includes calculating a predicted performance degradation of the first task when a second task is executed on the first computing machine, wherein the predicted performance degradation is determined by comparing a performance interference score of the second task with a performance sensitivity curve of the first task. The method further includes executing the second task on the first computing machine when the predicted performance degradation of the first task is below the performance degradation threshold.

24 Claims, 8 Drawing Sheets

(56) References Cited

U.S. PATENT DOCUMENTS

| | | | |
|---|---|---|---|
| 2002/0183972 A1* | 12/2002 | Enck et al. .................... | 702/186 |
| 2003/0005380 A1* | 1/2003 | Nguyen et al. ....... | G06F 11/273 |
| | | | 714/736 |
| 2003/0046396 A1* | 3/2003 | Richter et al. .......... | G06F 9/505 |
| | | | 709/226 |
| 2003/0158884 A1* | 8/2003 | Alford, Jr. ..................... | 709/104 |
| 2005/0046705 A1* | 3/2005 | Smith ......................... | 348/231.2 |
| 2005/0108327 A1* | 5/2005 | Hama .......................... | 709/203 |
| 2005/0169185 A1* | 8/2005 | Qiu et al. ...................... | 370/241 |
| 2005/0193376 A1* | 9/2005 | Harrison ............... | G06F 11/328 |
| | | | 717/127 |
| 2006/0059253 A1* | 3/2006 | Goodman et al. ............ | 709/223 |
| 2006/0072674 A1* | 4/2006 | Saha et al. ............. | H04N 19/51 |
| | | | 375/240.25 |
| 2006/0085597 A1* | 4/2006 | McNeill ........................ | 711/118 |
| 2008/0019278 A1* | 1/2008 | Niemczyk et al. ........... | 370/238 |
| 2008/0027769 A1* | 1/2008 | Eder ................................ | 705/7 |
| 2009/0328047 A1* | 12/2009 | Li et al. ................ | G06F 9/5033 |
| | | | 718/102 |
| 2010/0198960 A1* | 8/2010 | Kirschnick et al. ................... | G06F 11/3414 |
| | | | 709/224 |
| 2010/0223237 A1* | 9/2010 | Mishra et al. ...... | G06F 9/30156 |
| | | | 707/693 |
| 2011/0098973 A1* | 4/2011 | Seidman ...................... | 702/179 |
| 2012/0089664 A1* | 4/2012 | Igelka .......................... | 709/203 |
| 2012/0124606 A1* | 5/2012 | Tidwell et al. ................. | 725/17 |
| 2014/0215176 A1* | 7/2014 | Iga ........................ | G06F 11/008 |
| | | | 711/170 |

\* cited by examiner

ALLOCATION OF TASKS IN LARGE SCALE COMPUTING SYSTEMS

FIELD OF THE DISCLOSURE

The present disclosure relates generally to large scale computing systems and in particular to allocating tasks among computing machines in large scale computing systems.

BACKGROUND OF THE INVENTION

Large scale computing systems, sometimes called warehouse scale computers, are computing environments that are designed to host large scale services like cloud storage, web searching, and other data or computationally intensive applications. Large scale computing systems include multiple clusters of computing machines, each having a cluster manager. The cluster manager receives tasks from the large scale computing system and allocates the tasks among the computing machines in its cluster. Each computing machine houses a number of processors, or cores, in a number of central processing units (CPUs). For example, a computing machine may have 2-4 CPUs, and each CPU may have 4-8 processors.

Each task in a large scale computing system is a particular instance of an application, or executable binary code, in the large scale computing system. The task also includes a configuration file that specifies the machine level resources required by the application. The resources may include the number of processors, amount of memory, and disk space that is allocated to the application. Some applications may be latency sensitive, meaning that they have high quality of service standards and cannot tolerate substantial performance degradation. Examples of latency sensitive applications include Internet searches, online map functions, and e-mail services. Other applications are not latency sensitive and can tolerate greater interruptions in the quality of service. These applications are called batch applications, and some examples of batch applications include file backup, offline image processing, and video compression.

The cluster manager is responsible for allocating tasks among computing machines. Several tasks may be executed on one computing machine. However, as the number of tasks on a computing machine increases, each task may suffer performance degradation because the tasks share certain resources like memory and bus bandwidth. This may be problematic with latency sensitive tasks because the quality of service should be maintained within a certain threshold. Cluster managers tend to dedicate one computing machine to a latency sensitive task to ensure there is no performance degradation. However, such an allocation strategy ignores the possibility that other tasks may be executed on the same computing machine as the latency sensitive task without substantially disrupting its performance. The result is an under-utilization of resources because the cluster of computing machines is not operating at full capacity.

SUMMARY OF THE INVENTION

Aspects of the invention may be used to allocate tasks among computing machines in large scale computing systems. Methods are disclosed herein for modeling the performance degradation of a first application. In one aspect, the method includes executing the first application on a computing machine, where the first application uses common machine resources of the computing machine. The method further includes executing a memory expandable application on the computing machine, where the memory expandable application uses common machine resources of the computing machine and has a variable working set size. The method further includes varying the working set size of the memory expandable application, measuring a performance metric of the first application, and plotting the performance metric of the first application as a function of the working set size of the memory expandable application.

In another aspect, a method of assigning a performance interference score to a first application is disclosed. The method includes executing a reporter application on a first computing machine, where the reporter application measures its own performance. The method further includes executing the first application on the first computing machine and determining the performance degradation experienced by the reporter application when the first application is executed with the reporter application on the first computing machine. The method further includes assigning the first application the performance interference score based on the performance degradation experienced by the reporter application.

In another aspect, a method of allocating a plurality of tasks on a computing network is disclosed. The method includes executing a first task in the plurality of tasks on a first computing machine and determining a performance degradation threshold for the first task. The method further includes calculating a predicted performance degradation of the first task when a second task is executed on the first computing machine, where the predicted performance degradation is determined by comparing a performance interference score of the second task with a performance sensitivity curve of the first task. The method further includes executing the second task on the first computing machine when the predicted performance degradation of the first task is below the performance degradation threshold.

In another aspect, a cluster system within a large scale computing system is disclosed. The system includes a plurality of computing machines and a cluster manager. The cluster manager is configured to store a performance sensitivity curve and performance degradation threshold of a first task in a plurality of tasks and store a performance interference score of a second task in the plurality of tasks. The cluster manager is further configured to predict the performance degradation of the first task when the first task and second task are executed on a first computing machine in the plurality of computing machines and allocate the plurality of tasks among the plurality of computing machines.

BRIEF DESCRIPTION OF THE DRAWINGS

The methods and systems may be better understood from the following illustrative description with reference to the following drawings in which.

DETAILED DESCRIPTION

To provide an overall understanding of the invention, certain illustrative embodiments will now be described, including systems and methods for allocating tasks in a large scale computing system. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
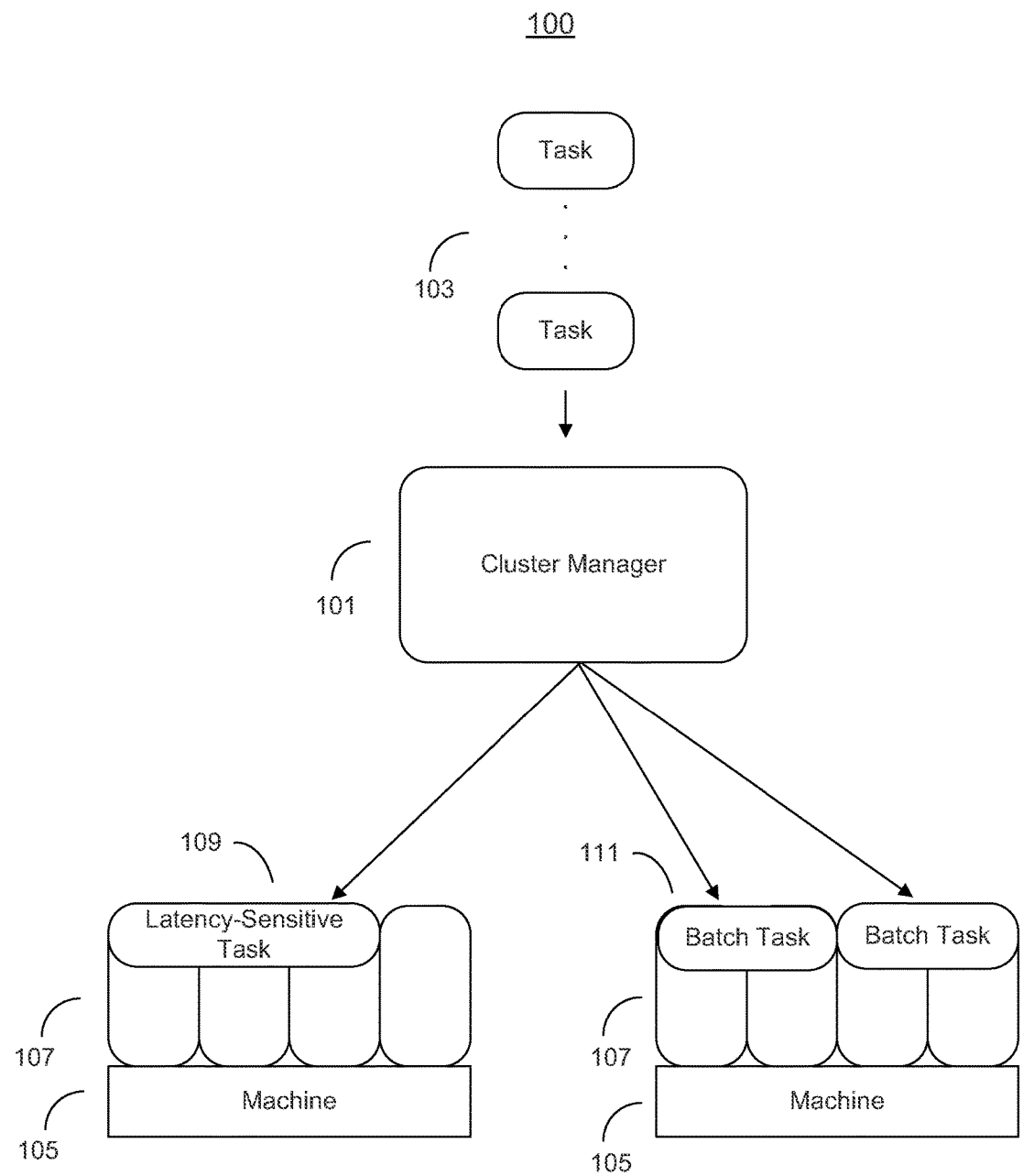
FIG. 1 shows a cluster within a large scale computing system in accordance with an embodiment of the invention.

In order to describe methods of allocating tasks in a cluster within a large scale computing system, a general cluster in a large scale computing system will first be discussed. FIG. 1 shows an example of a cluster 100 in a large scale computing system. A large scale computing system has multiple clusters. Cluster 100 includes a cluster manager 101 and a number of computing machines 105. Computing machines include a number of processors, or cores, 107. Cluster manager 101 may be implemented as a server. Cluster manager 101 receives incoming tasks 103 from the large scale computing system. Each task includes an underlying application and the configuration file for the application that describes the system resources that the application needs. These system resources may include the number of cores, amount of memory, and disk space that is allocated to the application. Cluster manager 101 uses the configuration file to determine which computing machine 105 has availability to execute the task based on the resource needs of the task. For example, a latency sensitive task 109 is executed on one computing machine and no other tasks may be executed on that computing machine. This ensures that no other tasks can degrade the performance of latency sensitive task 109. On the other hand, multiple batch tasks 111 may be assigned to a single computing machine because batch tasks 111 have a higher performance degradation tolerance.

The method of assigning tasks as described in FIG. 1 may be improved. Additional tasks may be executed on the same computing machine as a latency sensitive task if those additional tasks do not degrade the performance of the latency sensitive task beyond a certain threshold. The quality of service, or performance, of the underlying application may be quantified by a number of metrics. An example of a performance metric is $(\text{latency})^{-1}$, where latency is the amount of time that it takes to complete an operation in the application. Other metrics may include number of operations per second or amount of data processed per second. The metric is normalized to solo execution on a computing machine, meaning that the metric is equal to 1 when the application is executing alone on a computing machine and decreases as more applications are allocated to the same computing machine.

The performance degradation experienced by one task when another task is executed on the same computing machine can be predicted using the systems and methods described herein. If one task has a performance degradation threshold that should not be violated, a cluster manager can predict if another task can be executed on the same computing machine without violating the performance degradation threshold of the first task. In order for the cluster manager to predict performance degradation, certain performance-related attributes are first determined for all applications that can be executed in the cluster. A performance sensitivity curve is generated for certain applications executable in the cluster, for example latency sensitive applications. A performance interference score is also generated for certain applications executable in the cluster, for example batch applications. These performance-related attributes are generated using a common standard. For example, the performance sensitivity curve can be generated by measuring the performance degradation experienced by the application when executed with a reference application. Likewise, the performance interference score can be generated by measuring the performance degradation experienced by another reference application when executed with the application. The predetermined performance-related attributes are used by the cluster manager to predict performance degradation when allocating tasks among computing machines. The cluster manager may generate the performance-related attributes, or another stand-alone software application can be used to generate the performance-related attributes. Systems and methods for generating a performance sensitivity curve, generating a performance interference score, and then using these performance-related attributes to predict performance degradation between two tasks are described below.

Figure 2:
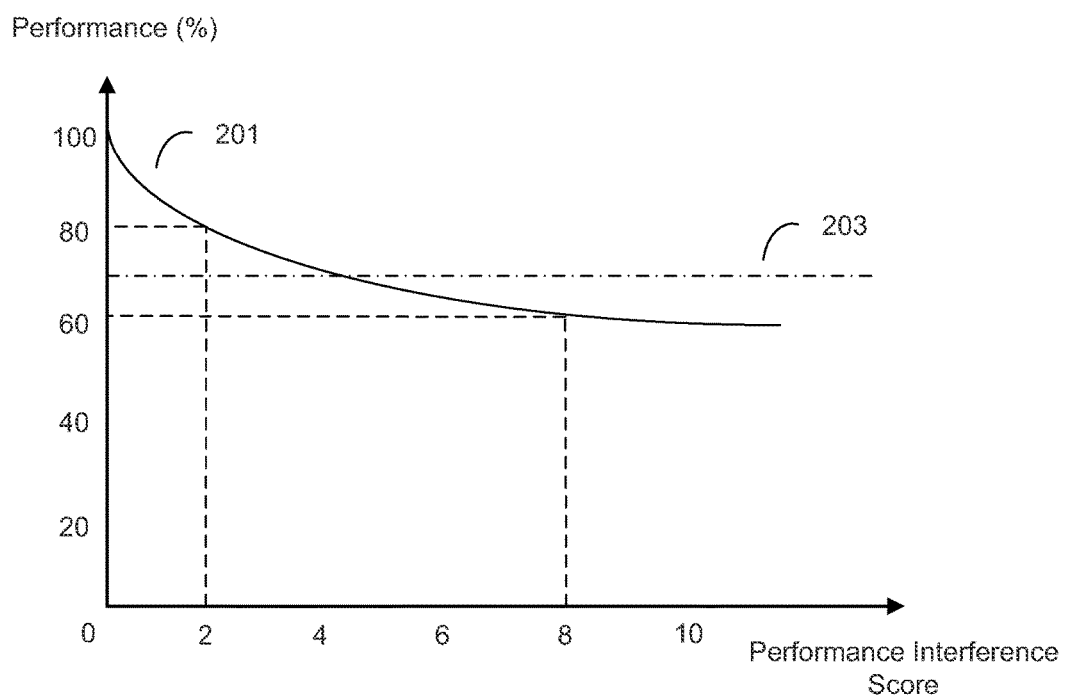
FIG. 2 shows a performance sensitivity curve for an application in accordance with an embodiment of the invention.

A performance sensitivity curve can be generated using a given performance metric for an application. The performance sensitivity curve generally shows the performance degradation of an application when another application is executed on the same computing machine. An example of a performance sensitivity curve is shown in FIG. 2. Chart 200 shows a performance sensitivity curve 201 for a particular latency sensitive application executing on a computing machine. The y-axis of the chart shows the performance of the application in percentage, with 100% indicating maximum performance when the application the executing alone on a computing machine. The x-axis shows a performance interference score of a second application that can be executed on the same computing machine as the latency sensitive application. A performance interference score is a measure of how much an application interferes with the performance of another application executing on the same computing machine. The interference exists because the two applications are sharing common resources like system memory and bus bandwidth. The performance interference score is a set of discrete whole numbers. The performance interference score can be based on or derived from a number of metrics or attributes of the application. For example, the performance interference score can be based on the amount of common system resources the application uses or the frequency with which the application uses the common system resources.

One example of a metric that can be used as a performance interference score is the working set size of an application. A working set size is the amount of memory needed by an application to perform all its necessary operations. It is usually measured in units of memory, for example megabytes (MB). A larger working set size indicates that the second application is using more shared resources on the computing machine and so the performance of the latency sensitive application may decrease. The performance interference score of the second application correlates with the working set size of the second application, with higher performance interference scores representing larger working set sizes. Methods of determining a performance interference score for an application are described with respect to FIGS. 5 and 6.

Chart 200 shows that the performance of a latency sensitive application deteriorates as the performance interference score of the second application increases. For example, if the second application's performance interference score is 2, then the performance of the latency sensitive application is approximately 80%. If the second application's performance interference score is 8, then the performance of the latency sensitive application is approximately 60%. The latency sensitive application has a performance degradation threshold 203 indicating the maximum tolerance of degradation that is allowable. The performance degradation threshold for a particular application is preset, for example by a system administrator determining performance tolerances in the large scale computing system. In chart 200, the performance degradation threshold is set at 70%. Thus an application with a performance interference score of 2 will not cause the latency sensitive application to violate the performance degradation threshold and can be executed on the same computing machine as the latency sensitive application. However, an application with a performance interference score of 8 will cause the latency sensitive application to violate the performance degradation threshold and should not be executed on the same computing machine as the latency sensitive application. Generally two latency sensitive applications should not be executed together as both utilize large amounts of shared resources and would likely cause each other to violate their respective performance degradation thresholds. Thus a cluster manager can use the performance sensitivity curve of a latency sensitive application to determine whether a batch application with a known performance interference score can be executed on the same computing machine as the latency sensitive application. In order to achieve this, the performance sensitivity curve of the latency sensitive application and the performance interference score of the batch application are first determined.

Figure 3:
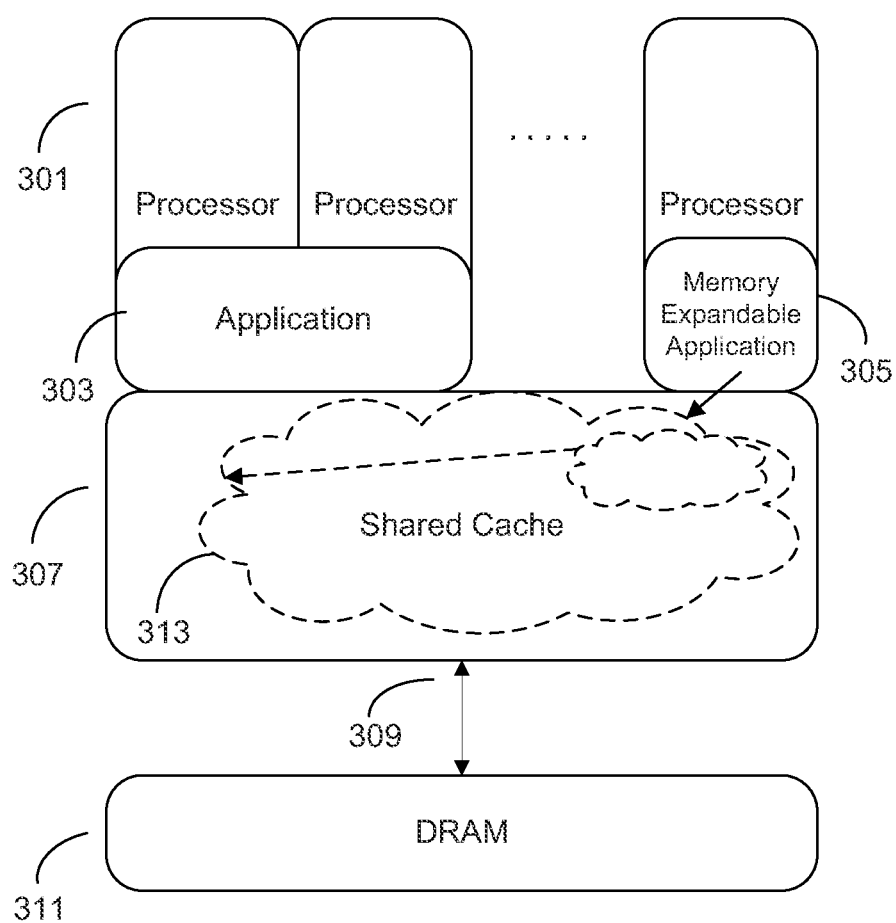
FIG. 3 shows the operation of a memory expandable application in accordance with an embodiment of the invention.

Systems and methods for generating a performance sensitivity curve for an application will now be discussed. FIG. 3 shows a computing machine 300 with multiple processors 301. The computing machine also has a shared memory cache 307, bus 309, and dynamic random access memory (DRAM) 311. The cache, bus, and DRAM are shared resources that are used by all applications executing on computing machine 300. There may be other shared resources not illustrated in FIG. 3, such as other forms of memory or communications channels. Application 303, generally a latency sensitive application, is executed on several but not all processors 301 on the computing machine. To generate a performance sensitivity curve for application 303, a memory expandable application 305 is executed on computing machine 300. The memory expandable application 305 is executed on one or more of the remaining processors 301 that are not already executing application 303.

Memory expandable application 305 is an application that is programmed to steadily vary its working set size 313. For example, the memory expandable application may be able to vary its working set size from 0 MB to 30 MB in 1 MB increments. Memory expandable application 305 executes a variety of simple operations to utilize shared resources. These operations may include random number generation, random memory accesses, and streaming data accesses. The operations should consume a wide variety of shared resources rather than a single shared resource in order to ensure an adverse performance effect on application 303. The memory expandable application can increase the number or size of these operations to increase its working set size. In some embodiments, an increase in working set size should result in a monotonic or near-monotonic increase in the shared resources that the memory expandable application utilizes. The performance interference score of memory expandable application 305 can be represented by its working set size because the performance of application 303 should decrease as the working set size of memory expandable application 305 is increased. In effect, the memory expandable application 305 can vary its performance interference score and so is useful in generating a performance sensitivity curve for application 303.

Memory expandable application 305 is initially executed on computing machine 300 with a working set size of 0 MB or near 0 MB. That is, it is not consuming any shared resources and application 303 is executing unimpeded. The working set size of the memory expandable application is slowly increased and a performance metric of application 303 is measured. This performance metric may be, for example, the latency of application 303. As the working set size of memory expandable application 305 increases, it increases the demand for the shared resources of the computing machine and degrades the performance of application 303. The performance sensitivity curve of application 303 is created by plotting its performance as a function of the working set size of the memory expandable application. This plot should resemble chart 200 in FIG. 2, but the shape of the curve 201 will be different for different applications 303.

Figure 4:
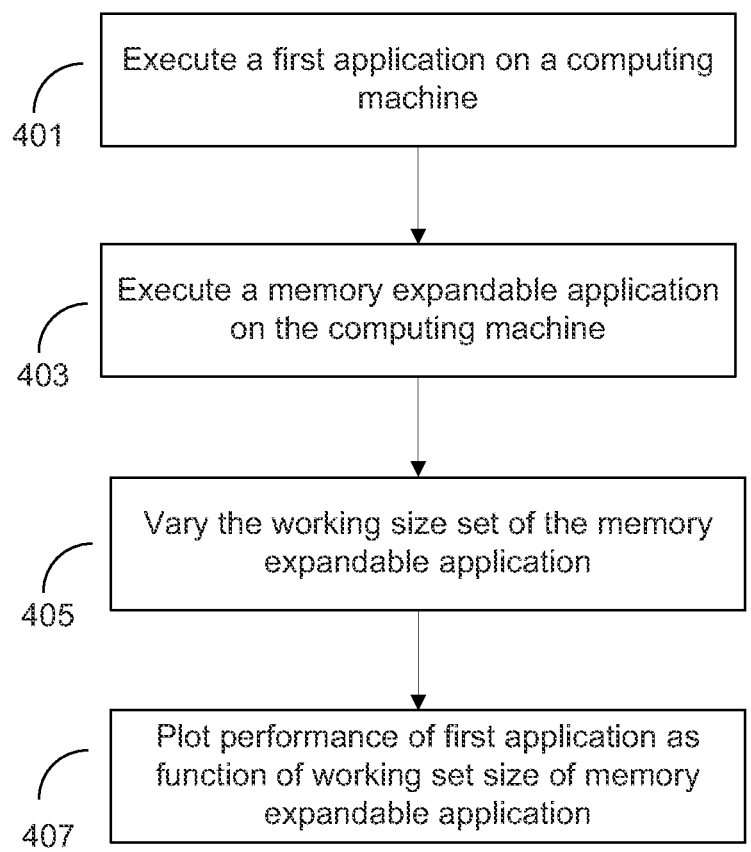
FIG. 4 shows a method of modeling the performance degradation of an application in accordance with an embodiment of the invention.

FIG. 4 is a flow chart depicting a method 400 of creating a performance sensitivity curve for a first application. The method 400 can be performed on a computing machine similar to the computing machine depicted in FIG. 3. The first application is executed on a number of processors on a computing machine, illustrated as step 401. A memory expandable application is then executed on the processors on the computing machine not used by the first application, illustrated as step 403. The working set size of the memory expandable application is varied, illustrated as step 405. Generally, the working set size is varied from 0 MB to a preset upper limit in discrete increments. The performance of the first application is measured as the working set size of the memory expandable application is increased. Lastly, the performance sensitivity curve of the first application is created by plotting its performance as a function of the working set size of the memory expandable application, illustrated as step 407. Thus a performance sensitivity curve can be generated for a latency sensitive application.

Figure 5:
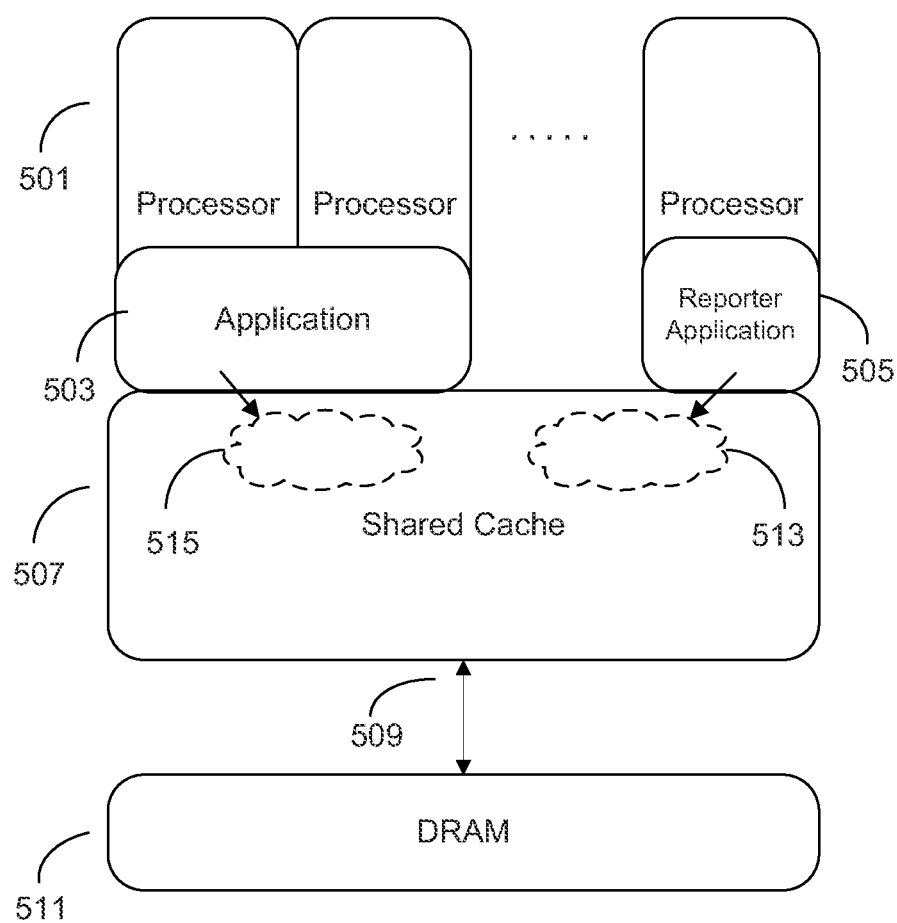
FIG. 5 shows the operation of a reporter application in accordance with an embodiment of the invention.

Systems and methods for determining a performance interference score of an application will now be discussed. FIG. 5 shows a computing machine 500 with multiple processors 501. The computing machine also has a shared memory cache 507, bus 509, and DRAM 511. The cache, bus, and DRAM are shared resources that are used by all applications executing on computing machine 500. There may be other shared resources not illustrated in FIG. 5, such as other forms of memory or communications channels. Application 503, generally a batch application, is executed on one or more but not all processors 501 on the computing machine. To generate a performance interference score for application 503, a reporter application 505 is executed on computing machine 500. The reporter application 505 is executed on one or more of the remaining processors 501 that are not already executing application 503.

A reporter application is an application that utilizes a wide variety of shared resources on the computing machine and can measure its own performance degradation when other applications also utilize the shared resources. The reporter application's working set size 513 in FIG. 5 is constant and is normally large enough to be able to use all the shared resources, including the last level cache, bus bandwidth, and prefetcher. The reporter application executes a number of simple operations, for example random memory accesses and streaming memory accesses, to achieve a certain working set size. The reporter application is designed to be sensitive to the load on the shared resources, meaning that other applications executing on the same computing machine will measurably degrade the reporter application's performance. The performance sensitivity curve of the reporter application should also be known and can be determined by the methods described in relation to FIGS. 3 and 4.

Application 503 in FIG. 5 has its own working set size 515 that utilizes the shared resources on computing machine 500. When application 503 is executed on the computing machine, reporter application 505 measures how much its performance has degraded due to the presence of application 503. Once the reporter application determines how much performance degradation it has suffered, the performance interference score of application 503 can be determined using the performance sensitivity curve of reporter application 505. For example, the chart 200 in FIG. 2 depicts the performance sensitivity curve of reporter application 505. Since the performance sensitivity curve is continuous over percentage but the performance interference score is a set of discrete whole numbers, an application's calculated performance interference score is selected to be the closest whole number that corresponds to the actual value indicated on the performance sensitivity curve. For example, if the performance degradation of reporter application 505 is 18% (i.e. the performance of reporter application 505 is 82%), then the performance interference score of application 503 is chosen to be 2, because it is the closest whole number score to the actual x-axis point that corresponds to 82% performance on the y-axis. This rounding to a whole number performance interference score may introduce some error intro the predicted interference of application 503 in a large scale computing system, as will be discussed below.

Figure 6:
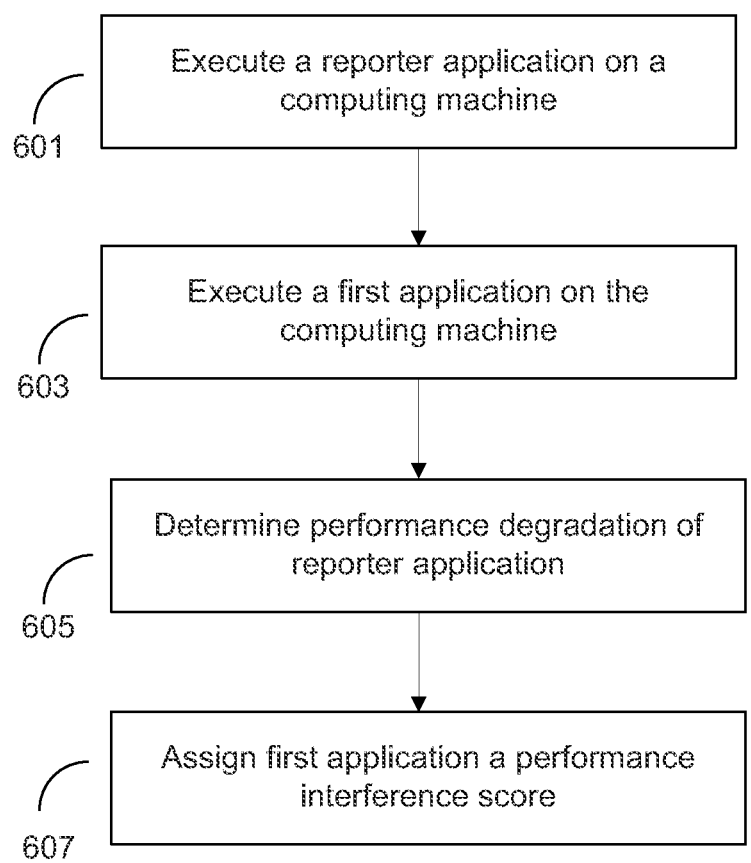
FIG. 6 shows a method of measuring the performance interference score of an application in accordance with an embodiment of the invention.

FIG. 6 is a flow chart depicting a method 600 of determining a performance interference score for a first application. The method 600 can be performed on a computing machine similar to the computing machine depicted in FIG. 5. A reporter application is first executed on a number of processors on a computing machine, illustrated as step 601. A first application is then executed on the processors on the computing machine not used by the reporter application, illustrated as step 603. The reporter application measures the performance degradation it suffers from the presence of the first application, illustrated as step 605. Then, using the performance sensitivity curve of the reporter application, a performance interference score is assigned to the first application that depends on how much the first application interfered with the performance of the reporter application, illustrated as step 607. Thus a performance interference score can be determined for a batch application. By determining the performance sensitivity curves for all latency sensitive applications capable of being executed in a cluster and the performance interference scores for all batch applications capable of being executed in a cluster, one can predict the performance degradation experienced by a latency sensitive application when a batch application is executed on the same computing machine. This prediction can be used to improve the allocation of tasks to computing machines in a cluster.

Figure 7:
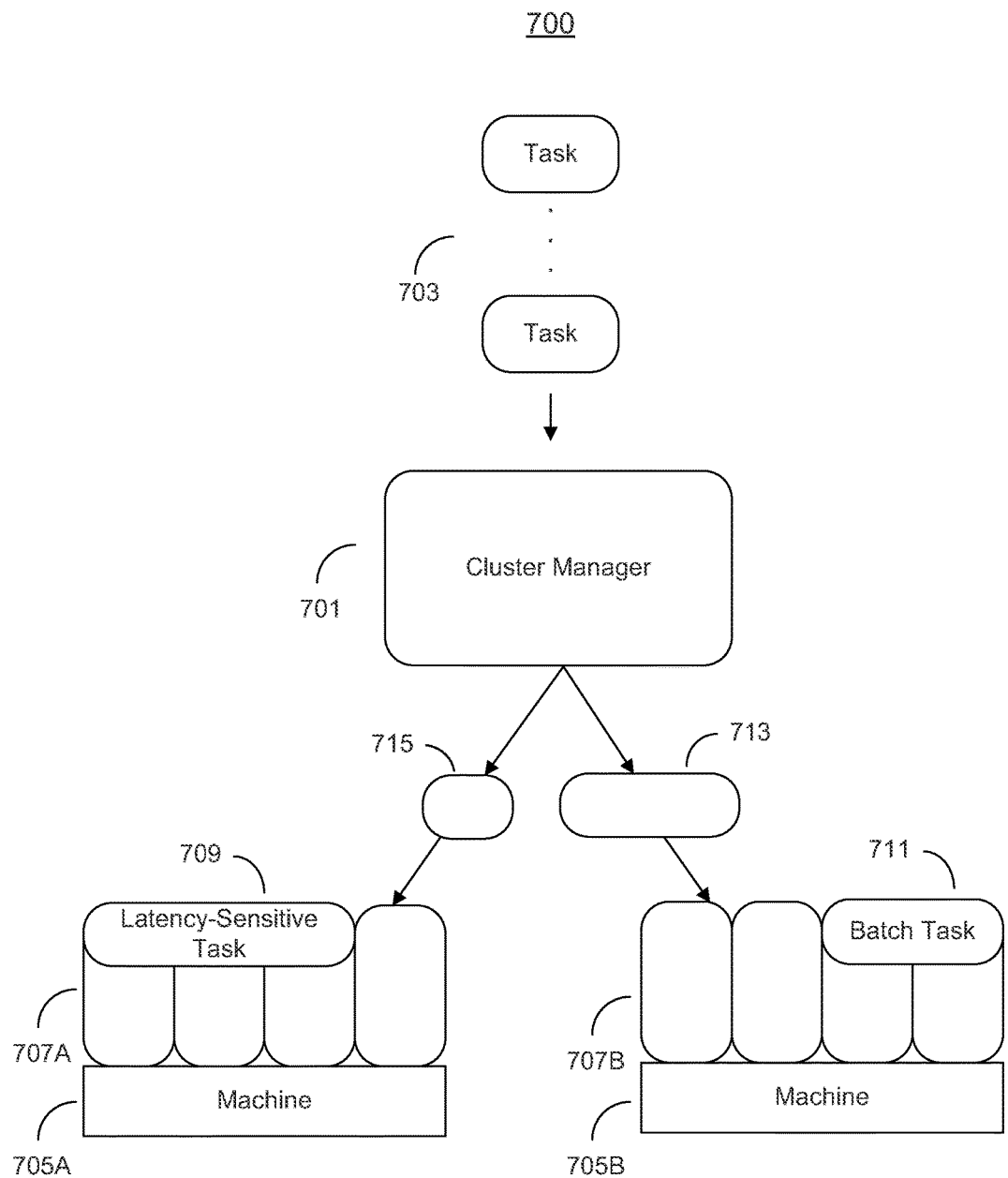
FIG. 7 shows an allocation of tasks in a cluster within a large scale computing system in accordance with an embodiment of the invention.

Systems and methods for allocating tasks in a cluster are now described. FIG. 7 shows a cluster 700 in a large scale computing system. Cluster 700 includes a cluster manager 701 that receives a number of incoming tasks 703 from the large scale computing system. Tasks 703 include the application and its corresponding configuration file, which specifies the system resources that the application needs. Cluster manager 701 stores performance information about the incoming tasks 703. If a task is a latency sensitive task, then cluster manager 701 stores the performance sensitivity curve and the performance degradation threshold for the underlying application of the task. If a task is a batch task, then cluster manager 701 stores the performance interference score for the underlying application of the task. For some applications, both a performance sensitivity curve and performance interference score can be determined. This performance information is determined beforehand for each known application using the methods described previously. The cluster manager or a stand-alone application can be used to determine the performance information. With this performance information, cluster manager 701 can efficiently allocate tasks among computing machines 705A, 705B, and other computing machines not illustrated in FIG. 7.

For example, task 709 is a latency sensitive task and is allocated to a plurality of processors 707A on computing machine 705A. A batch task 713 is to be allocated by cluster manager 701. Cluster manager 701 finds the performance interference score for the underlying application of task 713. Cluster manager 701 then finds the performance sensitivity curve for the underlying application of task 709. Cluster manager 701 uses the performance interference score of task 713 to determine a predicted performance degradation of task 709 if both tasks were executed on the same computing machine. For example, let chart 200 in FIG. 2 depict the performance sensitivity curve of task 709. If the performance interference score of task 713 is 8, then it is predicted to degrade task 709's performance to 60%, which violates the performance degradation threshold. Thus task 713 is not allocated to computing machine 705A with task 709 and is instead allocated to another computing machine 705B, which may already be executing another batch task 711.

Next, another batch task 715 is inputted to cluster manager 701. The cluster manager finds the performance interference score of task 715 and uses the performance sensitivity curve of task 709 to determine if both tasks can be executed on the same computing machine 705A without violating the performance degradation threshold of task 709. For example, if the performance interference score for task 715 is 2, then it is predicted to degrade task 709's performance to 80%, which does not violate the performance degradation threshold of task 709. Thus task 715 can be executed on computing machine 705A with task 709. In this manner, cluster manager 701 can allocate incoming tasks among multiple computing machines more efficiently, rather than reserving one computing machine to a single latency sensitive task and leaving cluster resources underutilized.

The performance interference score of an application is an approximation of its actual ability to interfere with other applications because its performance interference score is rounded using the performance sensitivity curve of a reporter application. Thus sometimes a task is predicted not to violate the performance degradation threshold of another task but in actuality it does violate the threshold. In some embodiments, the performance degradation threshold includes an error tolerance value so that minor violations of the threshold do not prevent allocation of both tasks to the same computing machine.

Figure 8:
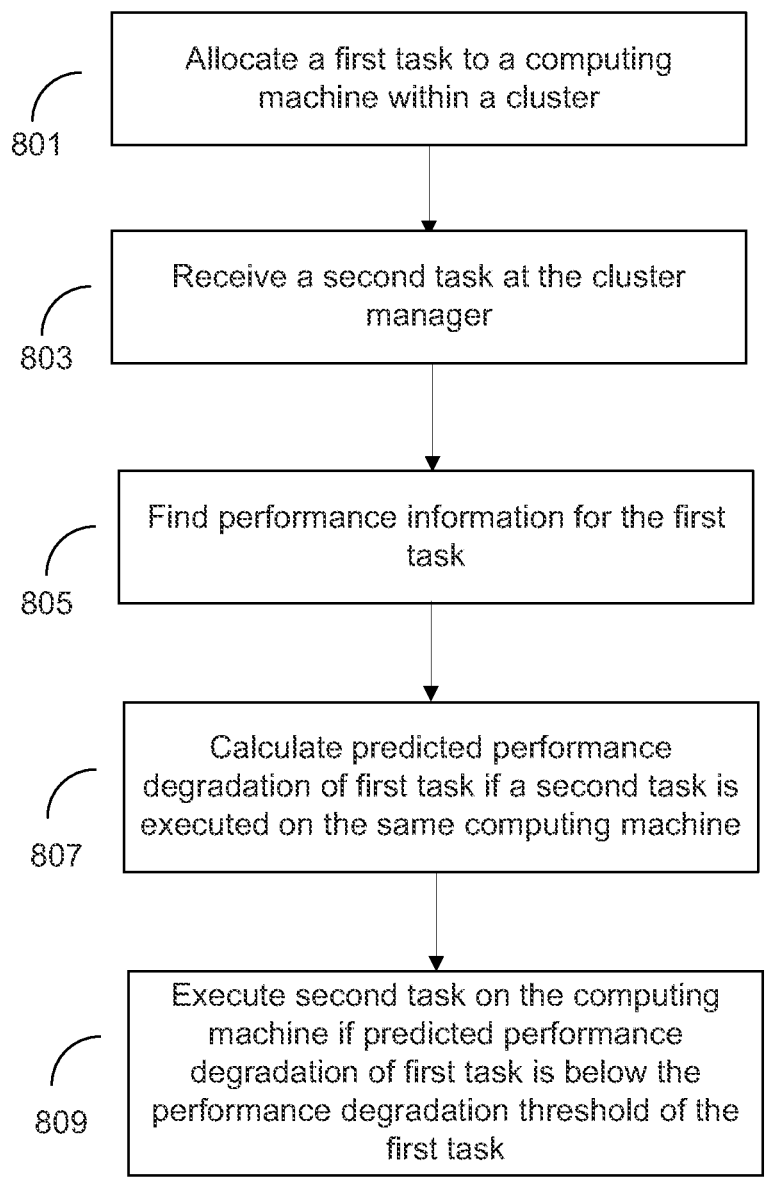
FIG. 8 shows a method of allocating tasks in a cluster within a large scale computing system in accordance with an embodiment of the invention.

FIG. 8 depicts a flowchart of a method 800 of allocating tasks in a cluster within a large scale computing system. Method 800 includes executing a first task on a computing machine, receiving a second task to be executed in the cluster, determining the performance information of the first and second tasks, and using the performance information to determine if the first and second tasks can be executed on the same computing machine without violating the performance degradation threshold of the first task. Method 800 is performed on a cluster within a large scale computing system similar to cluster 700 in FIG. 7.

A first task received by a cluster manager of the cluster is allocated to a computing machine, illustrated as step 801. The first task may be a latency sensitive task. The cluster manager then receives a second task to be allocated to a computing machine on the cluster, illustrated as step 803. The second task may be a batch task. The cluster manager then finds the performance information of the first task, illustrated as step 805. The performance information of the first task is stored in computer readable memory in the cluster manager. The performance information includes the performance sensitivity curve and the performance degradation threshold of the underlying application in the first task. The performance sensitivity curve is calculated beforehand using the methods described in relation to FIGS. 3-4. The cluster manager or a stand-alone application can be used to determine the performance sensitivity curve. The performance degradation threshold of the application is determined, for example, by a system administrator.

Once the performance information of the first task is obtained, the cluster manager predicts the performance degradation of the first task if the second task is executed on the same computing machine, illustrated as step 807. The cluster manager finds the performance interference score of the second task, which is stored in computer readable memory in the cluster manager. The performance interference score of the second task is determined beforehand using the methods described in relation to FIGS. 5 and 6. The cluster manager or a stand-alone application can be used to determine the performance interference score. The cluster manager uses the performance interference score of the second task to determine a predicted performance degradation of the first task using the performance sensitivity curve of the first task.

If the predicted performance degradation is lower than the performance degradation threshold of the first task, the second task is executed on the same computing machine as the first task, illustrated as step 809. If the predicted performance degradation is higher than the performance degradation threshold of the first task, then the second task is not executed on the same computing machine as the first task. The cluster manager may determine if the second task can be executed on another computing machine executing one or more other tasks using the predicted performance degradation analysis as described herein. The cluster manager may also allocate the second task to a computing machine that is not executing any other tasks. In this manner, a cluster manager can efficiently allocate tasks to computing machines in a cluster by maximizing utilization of resources.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method of modeling performance degradation of a first application, the method comprising:
   executing the first application on a computing machine, wherein the first application consumes a first varying portion of common machine resources of the computing machine;
   executing a memory expandable application on the computing machine, wherein the memory expandable application consumes a second varying portion of the common machine resources of the computing machine defined according to a variable working set size, wherein the first varying portion of the common machine resources is separate from the second varying portion of the common machine resources, and wherein the memory expandable application is an application that is programmed to incrementally vary its own working size set by varying a number of operations executed by the memory expandable application;
   causing changes to a size of the first varying portion of the common machine resources available to the first application by enlarging or reducing the second varying portion of resources in the common machine resources consumed by the memory expandable application;
   measuring a performance metric of the first application for each working set size; and
   plotting the performance metric of the first application as a function of the working set size of the memory expandable application.

2. The method of claim 1, wherein the first application is a latency sensitive application.

3. The method of claim 1, wherein the common machine resources comprise the cache and random access memory of the computing machine.

4. The method of claim 1, wherein varying the working set size of the memory expandable application comprises starting with the working set size at zero and increasing the working set size by discrete increments.

5. The method of claim 4, wherein measuring the performance metric of the first application comprises measuring the latency of the first application at each value of the varying working set size.

6. The method of claim 1, wherein the memory expandable application executes a plurality of operations and varies its working set size by increasing the plurality of operations it executes.

7. The method of claim 6, wherein the plurality of operations comprises random number generation, random memory accesses, and streaming data accesses.

8. The method of claim 1, wherein measuring the performance metric of the first application comprises measuring the latency of the first application.

9. A non-transitory computer-readable storage device encoded with a computer program product, the computer program product comprising instructions that when executed on one or more computers cause the one or more computers to perform operations comprising:

executing a first application on a computing machine, wherein the first application consumes a first varying portion of common machine resources of the computing machine;

executing a memory expandable application on the computing machine, wherein the memory expandable application consumes a second varying portion of the common machine resources of the computing machine defined according to a variable working set size, wherein the first varying portion of the common machine resources is separate from the second varying portion of the common machine resources, and wherein the memory expandable application is an application that is programmed to incrementally vary its own working size set by varying a number of operations executed by the memory expandable application;

causing changes to a size of the first varying portion of the common machine resources available to the first application by enlarging or reducing the second varying portion of resources in the common machine resources consumed by the memory expandable application;

measuring a performance metric of the first application for each working set size; and plotting the performance metric of the first application as a function of the working set size of the memory expandable application.

10. The non-transitory computer-readable storage device of claim 9, wherein the first application is a latency sensitive application.

11. The non-transitory computer-readable storage device of claim 9, wherein the common machine resources comprise the cache and random access memory of the computing machine.

12. The non-transitory computer-readable storage device of claim 9, wherein varying the working set size of the memory expandable application comprises starting with the working set size at zero and increasing the working set size by discrete increments.

13. The non-transitory computer-readable storage device of claim 12, wherein measuring the performance metric of the first application comprises measuring the latency of the first application at each value of the varying working set size.

14. The non-transitory computer-readable storage device of claim 9, wherein the memory expandable application executes a plurality of operations and varies its working set size by increasing the plurality of operations it executes.

15. The non-transitory computer-readable storage device of claim 14, wherein the plurality of operations comprises random number generation, random memory accesses, and streaming data accesses.

16. The non-transitory computer-readable storage device of claim 9, wherein measuring the performance metric of the first application comprises measuring the latency of the first application.

17. A computing system comprising:

one or more computers; and one or more data storage devices coupled to the one or more computers, storing instructions that, when executed by the one or more computers, cause the one or more computers to perform operations comprising:

executing a first application on a computing machine, wherein the first application consumes a first varying portion of common machine resources of the computing machine;

executing a memory expandable application on the computing machine, wherein the memory expandable application consumes a second varying portion of the common machine resources of the computing machine defined according to a variable working set size, wherein the first varying portion of the common machine resources is separate from the second varying portion of the common machine resources, and wherein the memory expandable application is an application that is programmed to incrementally vary its own working size set by varying a number of operations executed by the memory expandable application;

causing changes to a size of the first varying portion of the common machine resources available to the first application by enlarging or reducing the second varying portion of resources in the common machine resources consumed by the memory expandable application;

measuring a performance metric of the first application for each working set size; and plotting the performance metric of the first application as a function of the working set size of the memory expandable application.

18. The system of claim 17, wherein the first application is a latency sensitive application.

19. The system of claim 17, wherein the common machine resources comprise the cache and random access memory of the computing machine.

20. The system of claim 17, wherein varying the working set size of the memory expandable application comprises starting with the working set size at zero and increasing the working set size by discrete increments.

21. The system of claim 12, wherein measuring the performance metric of the first application comprises measuring the latency of the first application at each value of the varying working set size.

22. The method of claim 17, wherein the memory expandable application executes a plurality of operations and varies its working set size by increasing the plurality of operations it executes.

23. The system of claim 17, wherein the plurality of operations comprises random number generation, random memory accesses, and streaming data accesses.

24. The system of claim 17, wherein measuring the performance metric of the first application comprises measuring the latency of the first application.

* * * * *